United States Patent [19]
Furlani et al.

[11] Patent Number: 5,982,169
[45] Date of Patent: Nov. 9, 1999

[54] MICRO-ENCODER WITH MOLDED MICRO-MAGNET

[75] Inventors: Edward P. Furlani, Lancaster; Syamal K. Ghosh, Rochester, both of N.Y.

[73] Assignee: Eastman Kodak Company, Rochester, N.Y.

[21] Appl. No.: 08/936,123

[22] Filed: Sep. 24, 1997

[51] Int. Cl.[6] .................................. G01B 7/14; G01B 7/30
[52] U.S. Cl. .................................. 324/207.2; 324/207.25; 338/32 H
[58] Field of Search .................................. 324/174, 207.2, 324/207.21, 207.25, 252, 251, 117 H; 338/32 H, 32 R; 365/170, 171, 174, 2, 9; 164/6; 29/607, 608; 264/272.19; 335/302

[56] References Cited

U.S. PATENT DOCUMENTS

| | | | |
|---|---|---|---|
| 5,289,410 | 2/1994 | Katti et al. | 365/170 |
| 5,302,893 | 4/1994 | Yoshimura | 324/207.22 |
| 5,481,188 | 1/1996 | Mizutani | 324/207.25 |
| 5,572,120 | 11/1996 | Takaishi et al. | 324/207.21 |
| 5,643,194 | 7/1997 | Negre | 604/8 |
| 5,735,985 | 4/1998 | Ghose et al. | 156/89 |
| 5,791,040 | 8/1998 | Furlani et al. | 29/607 |

OTHER PUBLICATIONS

William J. Grande, Svetlana Reznik and Joy Ertel, "A Hall Effect Microsensor For Micromechanical Device Characterization", 1997, pages not available.

"Hall Effect Transducers", Microswitch, Honeywell, pp. 52–87.

*Primary Examiner*—Jay Patidar
*Attorney, Agent, or Firm*—Mark G. Bocchetti

[57] ABSTRACT

A micro-sized encoder which can be used to track the rotational position, angular velocity and acceleration of micro-sized rotating devices. The encoder includes an extrusion molded, micro-sized ceramic housing adapted to receive the radically micro-polarized, mullet-pole micromagnet with an axially shaft. End plates with integral bearings are formed which mount to the housing and support the axially shaft. A thin film Hall sensor mounted on the surface of the housing in proximity to the ratable micromagnet is used for sensing the radial field component of the micromagnet. The sensor is in communication with sensor electronics whereby, as the micromagnet rotates, the radially alternating north and south magnetic fields are sensed to the thin film Hall sensor and counted by the sensor electronics.

15 Claims, 5 Drawing Sheets

MICRO-ENCODER WITH MOLDED MICRO-MAGNET

FIELD OF THE INVENTION

The present invention relates generally to rotational encoders and, more particular, to micro-sized rotational encoders.

BACKGROUND OF THE INVENTION

Conventional magnetic encoders are used to track the rotational position, angular velocity and acceleration of rotating devices such as electric motors.

While conventional encoders are adequate for use with conventional motors they are far too large for use with micro-sized motors which are less than one (1) $mm^3$ in volume. One example of a micromotor is discussed in an article entitled "Coupled Electrostatic and Mechanical FEA of a Micromotor" which appeared in the December 1994 issue of the Journal of Microelectromechanical Systems. A second example of a micromotor is discussed in an article entitled "A Planar Variable Reluctance Magnetic Micromotor with Fully Integrated Stator and Coils" which appeared in December 1993 issue of the Journal of Microelectromechanical Systems. Conventional encoders would likely be too large for micro motors to drive and would surely inhibit the ability of the micromotor to perform its primary function. Therefore, there is a need for rotational encoders which can be adapted for use with micro-sized rotating apparatus.

SUMMARY OF THE INVENTION

It is, therefore, an object of the present invention to provide a micro-sized encoder which can be used to track the rotational position, angular velocity and acceleration of micro-sized rotating devices.

It is a further object of the present invention to provide a micro-sized molded ceramic magnetic encoder.

Briefly stated, the foregoing and numerous other features, objects and advantages of the present invention will become readily apparent upon a reading of the detailed description, claims and drawings set forth herein. These features, objects and advantages are accomplished by extrusion molding a micro-sized ceramic housing adapted to receive the radially, micro-polarized, multi-pole micro-magnet with an axially shaft. End plates with integral bearings are formed which mount to the housing and support the axially shaft. A thin film Hall effect sensor mounted on the surface of the housing in proximity to the ratable micro-magnet is used for sensing the radial field component of the micromagnet. The sensor is in communication with sensor electronics whereby, as the micromagnet rotates, the radially alternating north and south magnetic fields are sensed by the thin film Hall effect sensor and counted by the sensor electronics. The term "micro" as used herein in describing various elements such as micromagnets, micromotors, microencoders, micro-polarized, etc. is intended mean the smallest features of such elements is on the order of 100 microns in size.

DETAILED DESCRIPTION OF THE INVENTION

Figure 1:
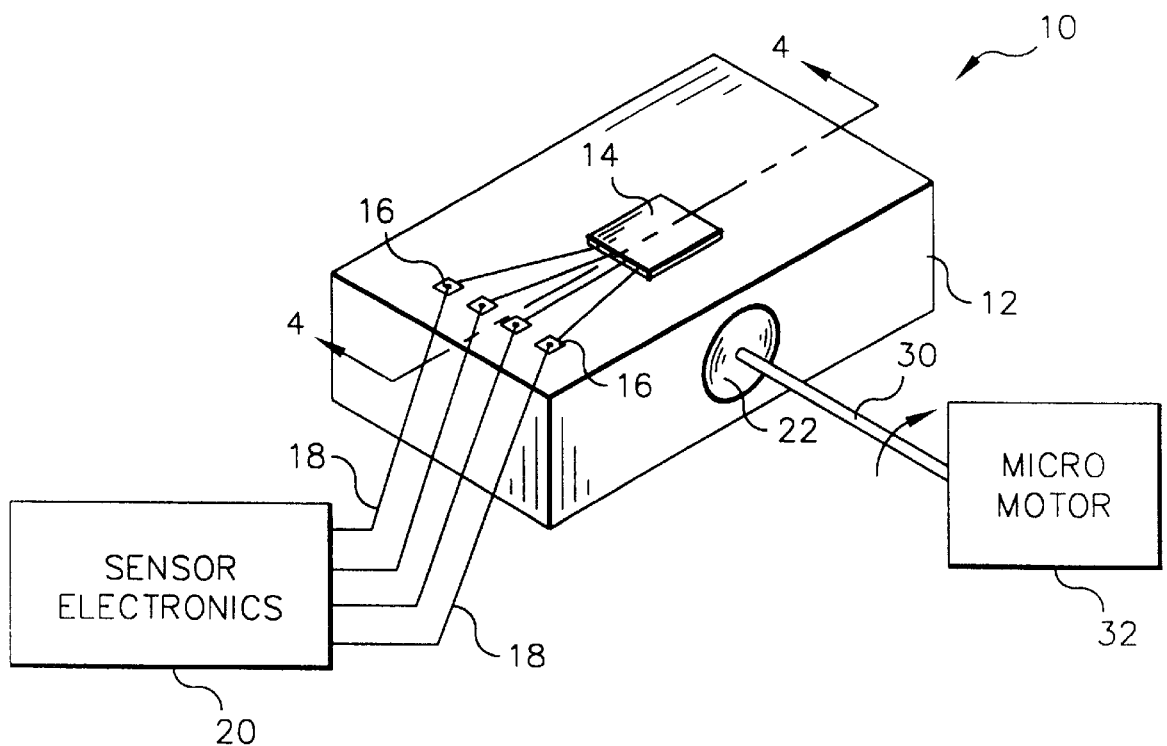
FIG. 1 is a perspective schematic of the microencoder of the present invention connected to a micromotor.

Turning first to FIG. 1, there is shown the microencoder 10 of the present invention. The microencoder 10 includes a micromolded ceramic housing 12 with a thin film Hall effect sensor 14 mounted on one surface thereof. An example of such a sensor 14 can be found in a paper entitled, "A Hall Effect Microsensor for Micromechanical Device Characterization" by William J. Grande et al. presented at the 1995 Intermag Conference. The thin film Hall effect sensor 14, which is a magnetic field sensor, is electrically connected to terminals 16, which are either affixed to or embedded in the surface of the ceramic housing 12. Conductors 18 connect terminal 16 to the sensor electronics 20. The Hall effect sensor 14 and the sensor electronics 20 which act as a controller means are well known to those skilled in the art. The sensor electronics 20 produce and process voltage outputs when the radial component of a magnetic field intersects the plane of the Hall effect sensor 14. The design and use of Hall effect sensors 14 and sensor electronics 20 are discussed in detail in a book entitled "Hall Effect Transducers" which is available from Micro Switch which is a division of Honeywell, Inc. of Freeport, Ill. Ceramic housing 12 has mounted thereto a pair of end plates 22 with each end plate 22 including an integrally formed bearing 24. The end plates 22 are fabricated by micromolding ceramic. The ceramic housing 12 which is formed by extrusion molding, as will be explained hereinafter, includes a central bore 26 therein.

Figure 2:
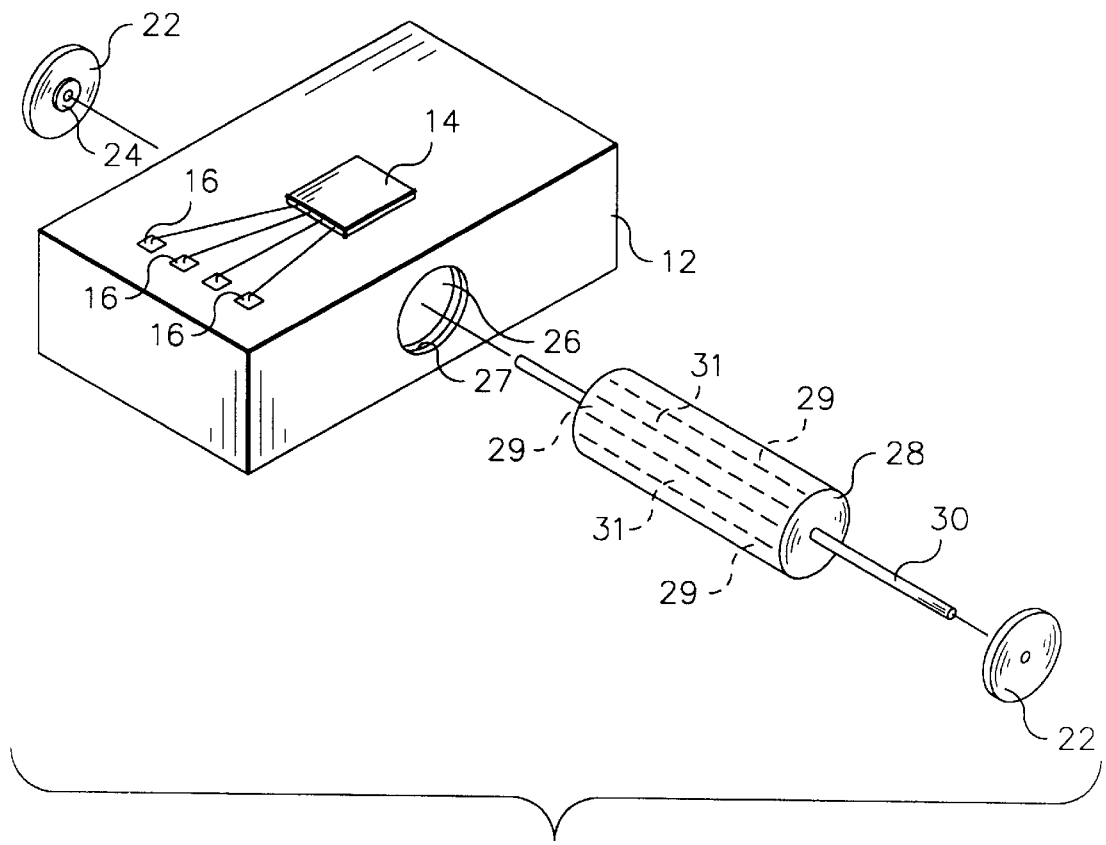
FIG. 2 is an exploded perspective view of the microencoder of the present invention.

Residing in central bore 26 is micromagnet 28 (see FIG. 2) which has an axial shaft 30 extending therethrough. Axial shaft 30 is preferably made of an engineering plastic such as, for example, glass filled fluorocarbon, PTFE, TFE, and Nylon 66. When assembled, end plates 22, which are micromolded ceramic pieces, are preferably epoxy bonded into end recesses 27 with bearings 24 supporting axial shaft 30 allowing for a free rotation of micromagnet 28 within central bore 26. Micromagnet 28 includes at least one north pole region 29 and at least one south pole region 31 on the perimetric surface thereof. Preferably, micromagnet 28 includes at least two north pole regions 29 and at least two south pole regions 31. North pole regions 29 and south pole regions 31 are arranged in an alternating pattern with each pole region 29, 31 having a microsized perimetric width.

Figure 3:
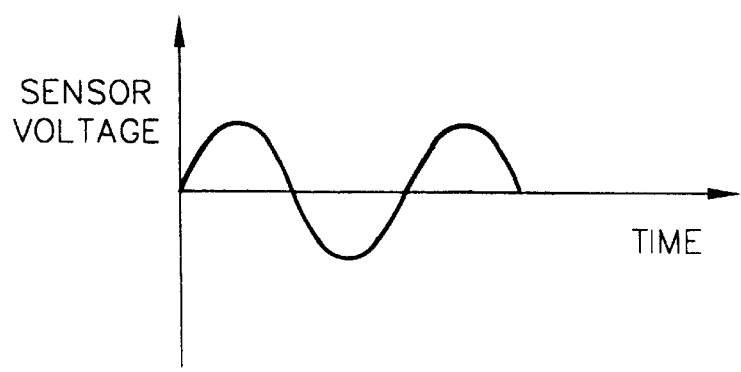
FIG. 3 is a graph showing output voltage from the sensor of the microencoder as a function of time (with magnet rotation).
Figure 4:
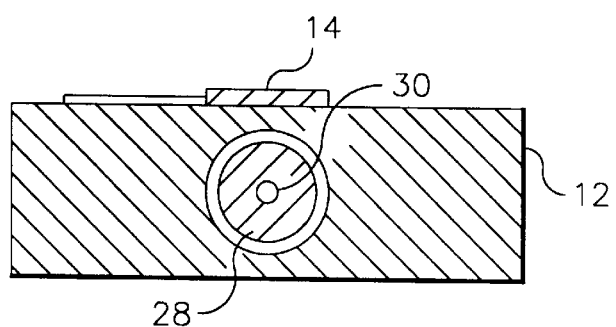
FIG. 4 is a cross-sectional view of the microencoder of FIG. 1 taken along line 4—4 of FIG. 1.

The proximity of the thin film Hall sensor 14 to the micromagnet 28 allows the sensor 14 to sense the radial magnetic field component of micromagnet 28. The output from the thin film Hall sensor 14 as the micromagnet 28 rotates is illustrated in FIG. 3. It is important to note that as the micromagnet 28 rotates, the sensor 14 is exposed to an alternating series of north and south surface poles which register as positive and negative voltages, respectively (or vise versa). The magnitude of the output voltage of sensor 14 is proportional to the magnitude of the magnetic field to which it is exposed and the sensor 14 can be mounted to the ceramic housing 12 so that the maximum voltage output occurs when a given pole is centered immediately beneath sensor 14. Therefore, as depicted in FIG. 4, as the micromagnet 28 rotates, sensor 14 outputs a series of positive and negative voltage pulses which can be input to an electronic controller 20 and used to track the angular rotation, angular velocity and acceleration of the micromagnet and, in turn, of a micromotor 32 to which it is connected as shown in FIG. 1.

Ceramic housing 12 with central bore 26 is preferably made by way of an extrusion process. The preferred oxide ceramic powders include zirconia ($ZrO_2$), alumina ($Al_2O_3$) and magnesia (MgO). Long rectangular tubes ranging in length from 5 to 20 cm are extruded at room temperature using a conventional piston type extruder. The ceramic powder used in the extruder is compounded with organic binders, water, a coagulant and a lubricant. Other additives should include lubricants, surfactants, dispersants, flocculants and antifoaming agents. Once extruded, the rectangular tube is debinded at a temperature in the range of from about 250° C. to about 500° C. to remove most of the organic binders. The extruded rectangular tube is then sintered. If one of the preferred oxide ceramics is used sintering should be performed at a temperature in the range of from about 1200° C. to about 1600° C. The actual sintering schedule and temperature will, of course, vary depending on the oxide ceramic used. The extruded rectangular tube is then cut to the desired length with a diamond saw. The process of ceramic extrusion involves forcing a highly viscous, mixture of ceramic powder having a dough-like consistency plus additives through a shaped die.

Figure 5:
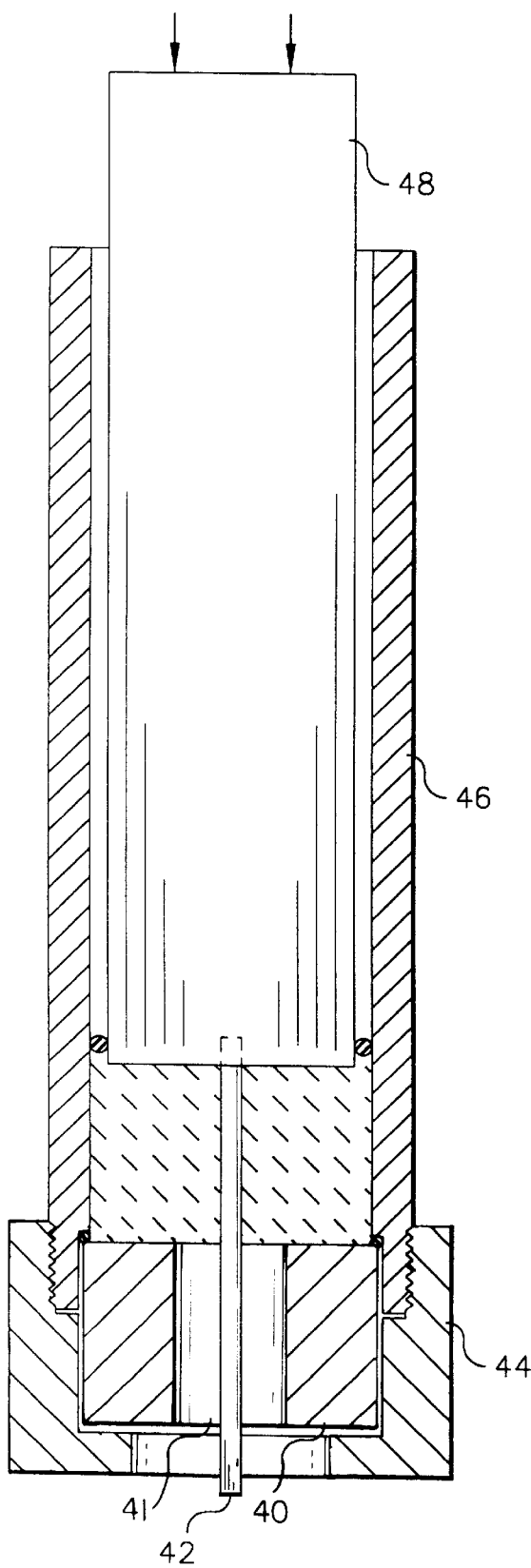
FIG. 5 is a schematic drawing representing the extrusion molding process used to form the housings of the microencoder.

An exemplary ceramic extrusion apparatus for making ceramic housing 12 is schematically depicted in FIG. 5. A microdie 40 with a circular core pin 42 can be used. The microdie 40 can be made from, for example, silicon carbide with a conventional ion etching process. Microdie 40 includes a rectangular extrusion orifice 41 through which circular core pin 42 extends. Circular core pin 42 can be made from hardened tool steel. Microdie 40 is retained in a die restraint 44 which threadably mounted on barrel 46. There is a piston 48 driven by means not shown capable of reciprocating movement within barrel 46. Circular core pin 42 mounts in a bore in the base of piston 48. The compounded ceramic powder 49 is driven by piston 48 to be extruded through extrusion orifice 41 thereby forming the above-mentioned rectangular tube.

Accounting for approximately 35 to 45 percent shrinkage after sintering, the ceramic housing 12 can have a height in the range of from about 1.5 mm to about 5 mm, a width in the range of from about 2 mm to about 10 mm, and a depth in the range of from about 2.5 mm to about 15 mm. The diameter of the central bore 26 is in the range of from about 1.2 to about 4 mm. The preferred ceramic material for the construction of ceramic housing 12 is selected from groups composed of oxides, carbides, borides, nitrides and ceramic composites consisting of two or more of the ceramics described herein. Oxide ceramics include alumina, zirconia and magnesia. Carbide ceramics include silicon carbide, tungsten carbide and titanium carbide. Nitride ceramics include silicon nitride, boron nitride and aluminum nitride. Borides include titanium diboride and zirconium diboride. If carbide, nitride or boride ceramics, or ceramic composites are used to form ceramic housing 12 then the sintering temperature will necessarily vary from the range stated above with regard to the preferred oxide ceramics.

The major additive for the extrusion process is a binder which provides a coating over each ceramic particle to allow flow during extrusion and to provide for adequate green strength after extrusion. Ceramic parts are typically referred to as "green" after formation but prior to sintering. A typical example of the make-up of a compounded ceramic powder for use in extrusion of green ceramic parts is as follows:

| | |
|---|---|
| Ceramic powder* | 50 vol % |
| Hydroxyethylcellulose (binder) | 6 vol % |
| Water | 42 vol % |
| $AlCl_3$ (coagulant) | <1 vol % |
| Stearic Acid (lubricant) | <1 vol % |

*The average particle size is preferably about 1 μm should be in the range of from about 0.5 μm to about 2 μm.

The above ingredients are mixed thoroughly to yield a homogeneous mixture. This is a key factor in successful extrusion.

The extrusion die can be fabricated using tool steel or cemented tungsten carbide or similar hard and durable tool materials which can be easily machined using an electron discharge machine (EDM). The die may be designed to contain a single or multiple central bores 26 so that one or more rectangular tubes can be formed in a single operation. The core pin which is used to form the central bore 26 can be made using the same tool material as the die. Alternative processes for forming ceramic housing 12 include injection molding or dry pressing.

Figure 6:
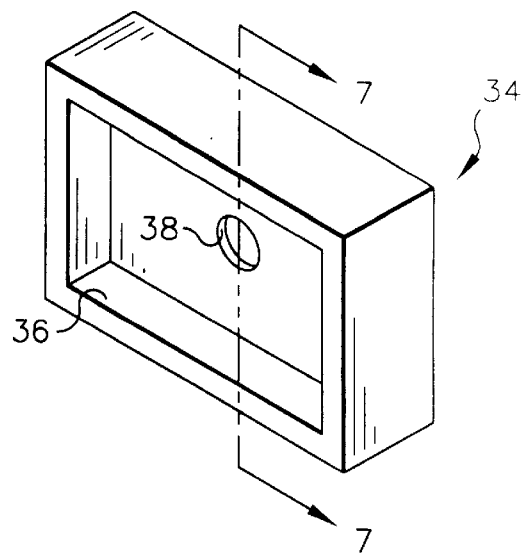
FIG. 6 is a perspective view of an alternative embodiment end cap.
Figure 7:
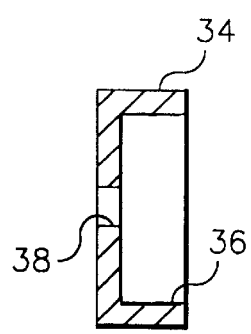
FIG. 7 is a cross-sectional view taken along line 7—7 of FIG. 6.

Referring next to FIGS. 6 and 7 there is depicted in the alternative end plate 34 for use with housing 12. Rather than shrink fitting into end recesses 27 of ceramic housing 12, alternative end plates 34 include a peripheral lip 36. Peripheral lips 36 are designed to allow alternative end plates 34 to be press fit over each end of ceramic housing 12. The alternative end plates 34 can be affixed to the ceramic housing 12 by means of epoxy or by braising. Each alternative end plate 34 includes a hole 38 therethrough which serves as a journal bearing.

The ceramic material selected for fabricating end plates 22 and alternative end plates 34 should be such that holes 24, 38 have a very low coefficient of friction against axial shaft 30. The ceramic material selected for end plates 22, 34 should preferably be zirconia (Y-TZP), boron nitride, silicon nitride, or zirconium diboride reinforced silicon carbide. Alternatively, end plates 22, 36 can also be formed using bulk graphite or a graphite-epoxy composite.

Figure 8:
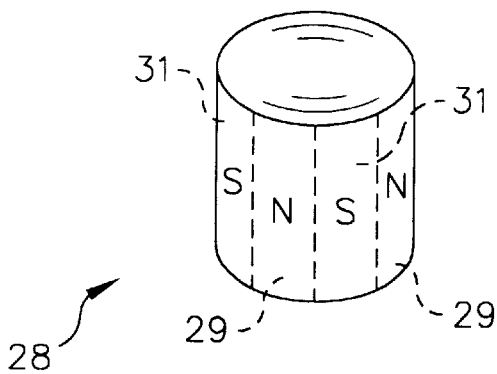
FIG. 8 is a perspective view of a micromagnet formed with alternating north and south pole regions on the cylindrical surface thereof.
Figure 9:
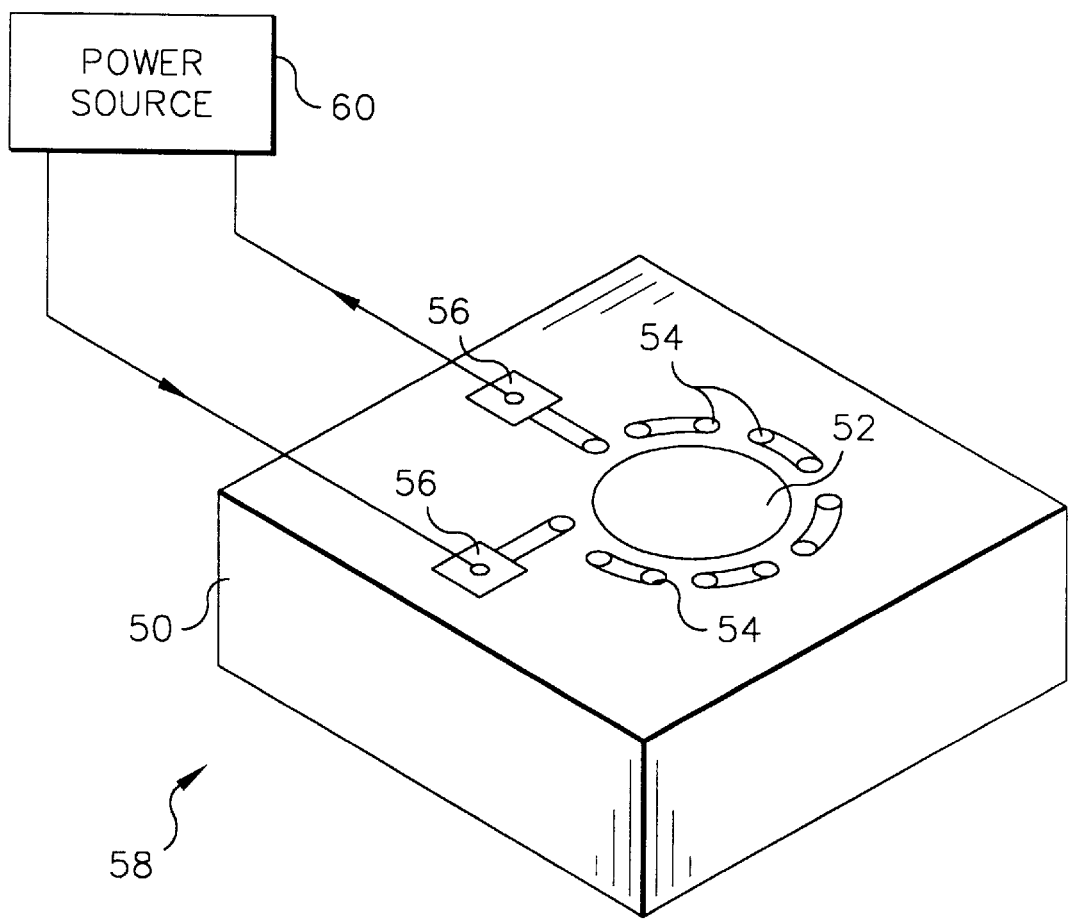
FIG. 9 is a schematic of a micropolarization tool for use in imparting the desired polarization pattern on the surface of a ferromagnetic element.
Figure 10:
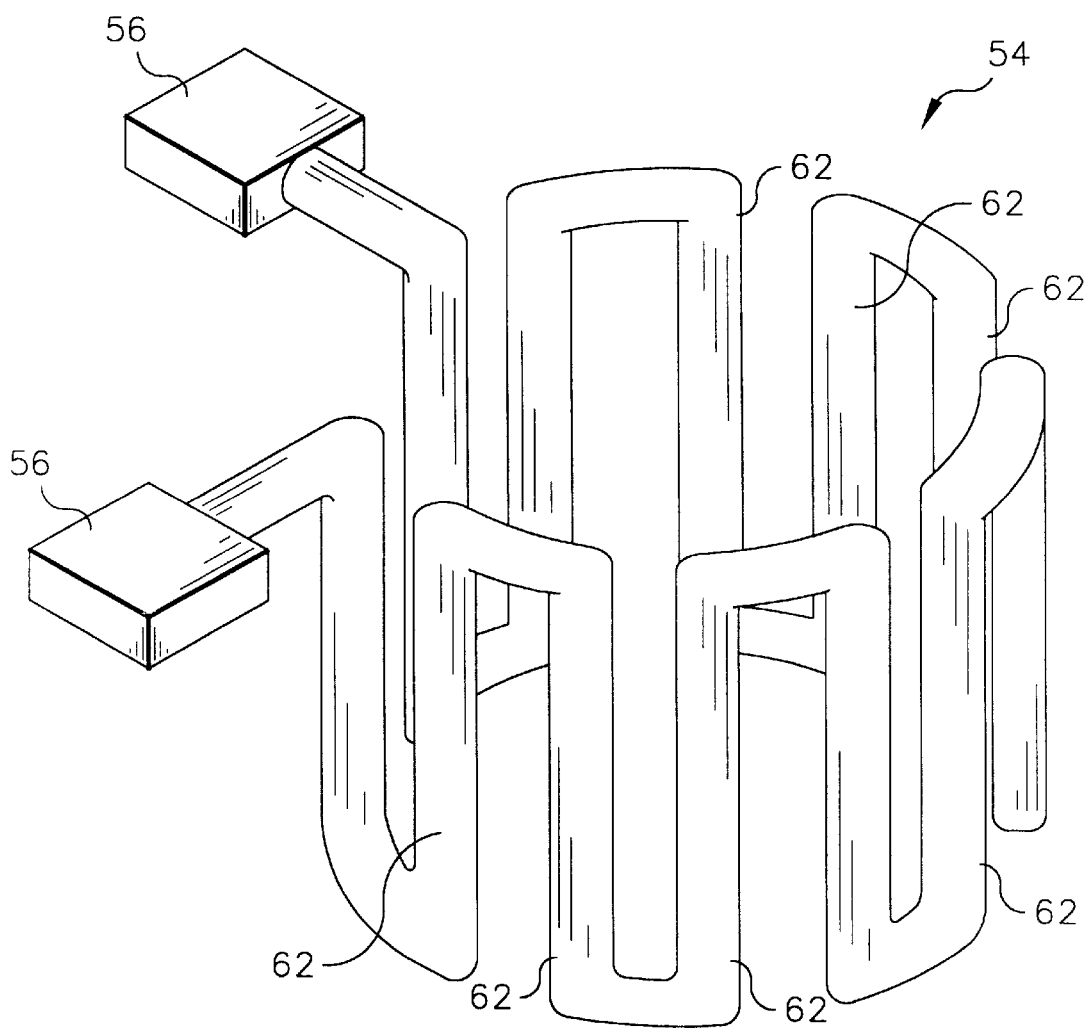
FIG. 10 is a perspective view of the serpentine electrical conductor embedded within the micropolarization tool depicted in FIG. 9.

As depicted in FIG. 8, micromagnet 28 includes alternating north and south surface poles about the periphery thereof. Micromagnet 28 can be formed by a process for the formation and polarization of micromagnets as taught in U.S. application Ser. No. 08/795,332 now U.S. Pat. No. 5,893,206, which is hereby incorporated herein by reference. Through the use of such process, surface poles ranging down to about 100 to 200 microns in width or less can be produced on the surface of magnets. In the practice of such method to produce cylindrical micromagnets 28, micromolded ceramic blocks 50 (see FIG. 9) are produced having a cylindrical cavity 52 therein. There is an electrical conductor 54 (see FIG. 10) embedded in ceramic block 50 which follows a serpentine path terminating at terminals 56. The bores through ceramic block 50 in which electrical conductor 54 resides are preferably formed during the molding of ceramic block 12. The electrical conductor 54 is itself formed by drawing a molten electrically conductive material into such bores by means of a vacuum. Once the micropolarization tool is formed, ferromagnetic powder such as NdFeB is compounded with a polymeric binder such as nylon and palletized into fine pellets for ease of handling. Cylindrical cavity 52 is filled with the compounded ferromagnetic powder which is then pressed to form ferromagnetic element 55. The cylindrical cavity 52 may have a central bore (not shown) at the base thereof for supporting axial shaft 30 during the formation of ferromagnetic element 55. Alternatively, an axial bore can be drilled through ferromagnetic element 55 after formation allowing axial shaft 30 to be inserted therethrough and epoxy bonded to ferromagnetic element 55. The compounded ferromagnetic powder should be heated above the glass transition temperature ($T_g$) of the thermoplastic polymer resin used as a bonding agent in the ferromagnetic powder prior to the pressing operation. Alternatively, a cylindrical ferromagnetic rod may be produced by extrusion and then cut into the desired sectional lengths to ferromagnetic elements 55. In either case, ferromagnetic elements 55 are placed in the micropolarization tool 58 and terminals 56 are connected to a DC power source 60. A high current is thereby delivered to the serpentine conductor 54 embedded within ceramic block 50 for a short period of time, preferably about 1 millisecond. The magnitude of the current is limited by the maximum operating temperature of the conductors. Looking at current in a continuous operating mode, current densities on the order of $10^5$ amps per cm$^2$ can be obtained in practice which translates into a current of approximately 7 amps for a 100 $\mu$m diameter conductor. Of course, pulse currents are used for magnetic polarization which can, therefore, be orders of magnitude higher. The current pulse produces an electromagnetic field emanating from each bus bar 62 of the electrical conductor 54 thereby polarizing the surface of the ferromagnetic element 55 within cavity 52 in such a way so as to render the desired micro-polarization pattern on the surface of the ferromagnetic element 55. In such manner, a micromagnet 28 is produced which can be as small as about 1.5 mm$^3$ in total volume. The spaced apart bus bars 62 of electrical conductor 54 thereby produce a micromagnet 28 with alternating north pole regions 29 and south pole regions 31 with each of such regions 29, 31 having a perimetric width in the range of from less than about 100 microns to about 500 microns. It is possible that the perimetric width of pole regions 29, 31 could be as small as 10 microns. The term "perimetric width" is used herein to means that segment dimension of each pole region 29, 31 at the perimeter of magnet 28 where a plane perpendicular to the axis of rotation of axial shaft 30 intersects the exterior surface of magnet 28. That segment may be a straight line segment, or an arcuate segment, or combinations thereof.

In order to track the rotational position, angular velocity and acceleration of micro-sized rotating devices it is necessary that micromagnet 28 have at least one north pole region 29 and at least one south pole region 31. Preferably, each micromagnet 28 will have at least two north pole regions 29 and at least two south pole regions 31 arranged in an alternating pattern.

It will be recognized by those skilled in the art that although ceramic housing 12 is described herein as being rectangular, other geometric shapes may be used to form ceramic housing 12. The principal purpose for ceramic housing 12 in conjunction with end plates 22, 34 is to support micromagnet 28 on axially shaft 30 therein. For that same reason, although ceramic housing 12 is described as having a central bore 26 which is cylindrical, central bore 26 may also be shaped differently such as for example, rectangular or triangular. The principal requirement for central bore 26 is that there be adequate clearance to allow for free rotation of micromagnet 28 without interference. The micromagnet 28 is preferably cylindrical in shape, that is, circular in cross section. However, it should be understood that micromagnet 28 can be a variety of different shapes. The shape need only be sufficient such that a plurality of alternating pole regions 29, 31 can be imparted thereto. Thus, the cross sectional shape of micromagnet 28 can be, for example, polygonal with each side thereof having a north pole region 29 or a south pole region 31. Micromagnet 28 could even be spherical or conical in shape. Regardless of the shape selected for micromagnet 28, it would be preferable that such shape allows micromagnet 28 to be balanced about an axis of rotation (axial shaft 30). The diameter of micro-magnet 28 is preferably in the range of from about 1 mm to about 3 mm. The diameter of axial shaft 30 is preferably in the range of from about 0.1 mm to about 0.5 mm.

From the foregoing, it will be seen that this invention is one well adapted to attain all of the ends and objects hereinabove set forth together with the other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A microencoder comprising:
   (a) a molded ceramic housing;
   (b) a micromagnet rotatably supported in said housing, said micromagnet having a diameter in the range of from about 1 mm to about 3 mm, said micromagnet having at least one north pole region and at least one south pole region on an exterior surface thereof, said at least one north pole region and said at least one south pole region residing in an alternating pattern with one another, said exterior surface being parallel to an axis of rotation of said micromagnet; and
   (c) a magnetic field sensor affixed to a surface of said molded ceramic housing.

2. A microencoder as recited in claim 1 further comprising:
   a controller means electrically connected to said magnetic field sensor for tracking angular rotation, angular velocity and acceleration of said micromagnet.

3. A microencoder as recited in claim 1 wherein:
   said micromagnet is cylindrical in cross section.

4. A microencoder as recited in claim 1 wherein:
   each of said at least one north pole region and said at least one south pole region has a width in the range of from about 100 microns to about 500 microns.

5. A microencoder as recited in claim 1 wherein:
   said magnetic field sensor is a thin film Hall effect sensor.

6. An encoder comprising:

(a) a molded ceramic housing;

(b) a magnet supported in said housing and having an axis of rotation, said magnet having a maximum dimension perpendicular to said axis of rotation in the range of from about 1 mm to about 3 mm, said magnet having at least one north pole region and at least one south pole region on a peripheral surface thereof, said at least one north pole region and said at least one south pole region residing in an alternating pattern with one another, said peripheral surface being parallel to said axis of rotation; and (c) a magnetic field sensor affixed to a surface of said molded ceramic housing.

7. An encoder as recited in claim 2 wherein:

each of said at least one north pole region and said at least one south pole region has a width in the range of from about 100 microns to about 500 microns.

8. An encoder as recited in claim 2 wherein:

said magnetic field sensor is a thin film Hall effect sensor.

9. A microencoder comprising:

(a) a molded housing having a central bore therethrough, said molded housing having two open ends;

(b) an end cap affixed to each of said two open ends, each of said two end caps including an integrally formed journal bearing therein;

(c) a magnet residing in said housing, said magnet having a diameter in the range of from about 1 mm to about 3 mm, said magnet having at least two north pole regions and at least two south pole regions an exterior surface thereof, said at least two north pole regions and said at least two south pole regions residing in an alternating pattern with one another;

(d) an axial shaft extending through said magnet, said axial shaft rotatably supported in said journal bearings, said axial shaft having a diameter in the range of from about 0.1 mm to about 0.5 mm; and (e) a magnetic field sensor affixed to a surface of said molded ceramic housing.

10. A microencoder as recited in claim 9 further comprising:

a controller means electrically connected to said magnetic field sensor for tracking angular rotation, angular velocity and acceleration of said magnet.

11. A microencoder as recited in claim 10 wherein:

each of said at least one north pole region and said at least one south pole region has a width in the range of from about 100 microns to about 500 microns.

12. A microencoder as recited in claim 9 wherein:

said molded housing in an extruded ceramic.

13. A microencoder as recited in claim 9 wherein:

said micromagnet is cylindrical in cross section.

14. A microencoder as recited in claim 9 wherein:

each of said at least two north pole regions and said at least two south pole regions has a width in the range of from about 10 microns to about 500 microns.

15. A microencoder as recited in claim 9 wherein:

said magnetic field sensor is a thin film Hall effect sensor.

* * * * *